United States Patent [19]
Ehlers et al.

[11] Patent Number: 4,793,961
[45] Date of Patent: Dec. 27, 1988

[54] METHOD AND SOURCE FOR PRODUCING A HIGH CONCENTRATION OF POSITIVELY CHARGED MOLECULAR HYDROGEN OR DEUTERIUM IONS

[75] Inventors: Kenneth W. Ehlers, Alamo; Ka-Ngo Leung, Hercules, both of Calif.

[73] Assignee: The United States of America as represented by the Department of Energy, Washington, D.C.

[21] Appl. No.: 517,476

[22] Filed: Jul. 26, 1983

[51] Int. Cl.$^4$ .................. G21B 1/00; H05H 1/00
[52] U.S. Cl. .................. 376/127; 376/144;
250/427; 313/361.1; 313/363.1; 315/111.31;
315/111.41; 315/111.61; 315/111.81
[58] Field of Search .............. 376/108, 121, 127, 130,
376/144, 150, 116, 117, 190; 250/423 R, 424,
427; 313/359.1, 361.1, 362.1, 363.1; 315/111.21,
111.31, 111.41, 111.61, 111.81

[56] References Cited

U.S. PATENT DOCUMENTS

| | | | |
|---|---|---|---|
| 2,856,532 | 10/1958 | Martina | 250/427 |
| 3,432,709 | 3/1969 | Lee et al. | 313/359.1 |
| 4,140,943 | 2/1979 | Ehlers | 376/144 |
| 4,246,481 | 1/1981 | Liebl | 250/424 |
| 4,259,145 | 3/1981 | Harper et al. | 313/359.1 |
| 4,301,391 | 11/1981 | Seliger et al. | 315/111.31 |
| 4,383,177 | 5/1983 | Keller et al. | 250/423 R |
| 4,447,732 | 5/1984 | Leung et al. | 250/427 |

OTHER PUBLICATIONS

UCRL-87831, "Multi-Megawatt Neutral Beams for MFTF-B", Nov. 1982, Kerr.
LBL-14955, "A High Concentration $H_2^+$ or $D_2^+$ Ion Source", Jan. 1983, Ehlers et al.

Primary Examiner—Deborah L. Kyle
Assistant Examiner—Richard L. Klein
Attorney, Agent, or Firm—L. E. Carnahan; Roger S. Gaither; Judson R. Hightower

[57] ABSTRACT

A high concentration of positive molecular ions of hydrogen or deuterium gas is extracted from a positive ion source having a short path length of extracted ions, relative to the mean free path of the gas molecules, to minimize the production of other ion species by collision between the positive ions and gas molecules. The ion source has arrays of permanent magnets to produce a multi-cusp magnetic field in regions remote from the plasma grid and the electron emitters, for largely confining the plasma to the space therebetween. The ion source has a chamber which is short in length, relative to its transverse dimensions, and the electron emitters are at an even shorter distance from the plasma grid, which contains one or more extraction apertures.

12 Claims, 8 Drawing Sheets 4,793,961

METHOD AND SOURCE FOR PRODUCING A HIGH CONCENTRATION OF POSITIVELY CHARGED MOLECULAR HYDROGEN OR DEUTERIUM IONS

The United States Government has rights in this invention pursuant to Contract No. DE-AC03-76SF00098 between the United States Department of Energy and the University of California.

FIELD OF THE INVENTION

This invention relates to a method and a source for producing positively charged molecular ions of hydrogen ($H_2^+$) or deuterium (($D_2^+$).

BACKGROUND OF THE INVENTION

Neutral beam injection has proven to be an effective way to heat plasmas in tokamaks as well as mirror devices. Multi-amperes of neutral atoms have already been obtained from deuterium ions for energies as high as 120 keV. In some future fusion reactors, such as the Mirror Fusion Test Facility at the Lawrence Livermore Laboratory, high currents of lower energy (40 keV) deuterium atoms are required in certain neutral beam lines. In that respect, it is more advantageous to form the neutral atoms from the molecular $D_2^+$ ions and accelerate them to twice the energy (80 keV). In passing through the gas neutralizer, these $D_2^+$ ions will first dissociate and will then be neutralized to form two atomic particles with half the original $D_2^+$ ion energy. However, this technique is useful only if ion sources that can generate a high percentage (>70%) of $D_2^+$ ions are available.

SUMMARY OF THE INVENTION

One principal object of the present invention is to provide a novel method and apparatus for generating a high concentration of $H_2^+$ or $D_2^+$ ions by using a new and improved multicusp ion source. The basic principle in achieving a high percentage of $H_2^+$ or $D_2^{30}$ ions is to extract them from the source as soon as they are produced. Otherwise they will react with background gas molecules to form tri-atomic ions $H_3^+$ or $D_3^+$ or be dissociated by electrons. The former reaction $H_2^+ + H_2 \rightarrow H_3^+ + H$ have a very short mean free path length $\lambda$. Assuming a background neutral gas density of approximately $3.3 \times 10^{13}$ cm$^{-3}$ and a cross-section $\sigma$ of approximately $6 \times 10^{-15}$ cm$^2$ $80 = (n_o\sigma)^{-1}$ is estimated to be about 5 cm. Thus the distance traversed by the $H_2^+$ ion before it arrives at the extaactor electrode cannot exceed this value. This in turn sets a limit on the length of the source chamber.

Among the novel features of this invention is the provision of a short ion source, both physically and electrically. This is accomplished by placing the filaments close to the plasma grid which is connected electrically to the ion source shell. The plasma grid thus becomes part of the anode. Also, the length and width of the source is approximately 40 cm × 10 cm, for example, but the depth is only about 6 cm, for example. Because the physical distance from the filaments to the plasma grid is substantially less than the mean free path for neutralization or capture of a $H_2^+$ ion, the ratio of the desired ion to total ions is about 80%. The same applies to $D_2^+$ ions. The positive ions are extracted from the source by a negative voltage which may vary widely, according to the application, from 300 volts or lower to 40 keV, or higher, for example.

The source utilizes a multicusp magnetic field, produced by rows of magnets, for example, which may be of the samarium-cobalt type. Such magnetic field on the back plate reduces the effective path length and loss of the positive ions before they are extracted from the source. In turn, it increases the primary electron path length by making it difficult for these electrons to be lost to the surfaces protected by the magnetic field.

BRIEF DESCRIPTION OF THE DRAWINGS

Further objects, advantages and features of the present invention will appear from the following description of an illustrative embodiment, taken with the accompanying drawings, in which.

DETAILED DESCRIPTION OF ILLUSTRATIVE EMBODIMENTS

Figure 1:
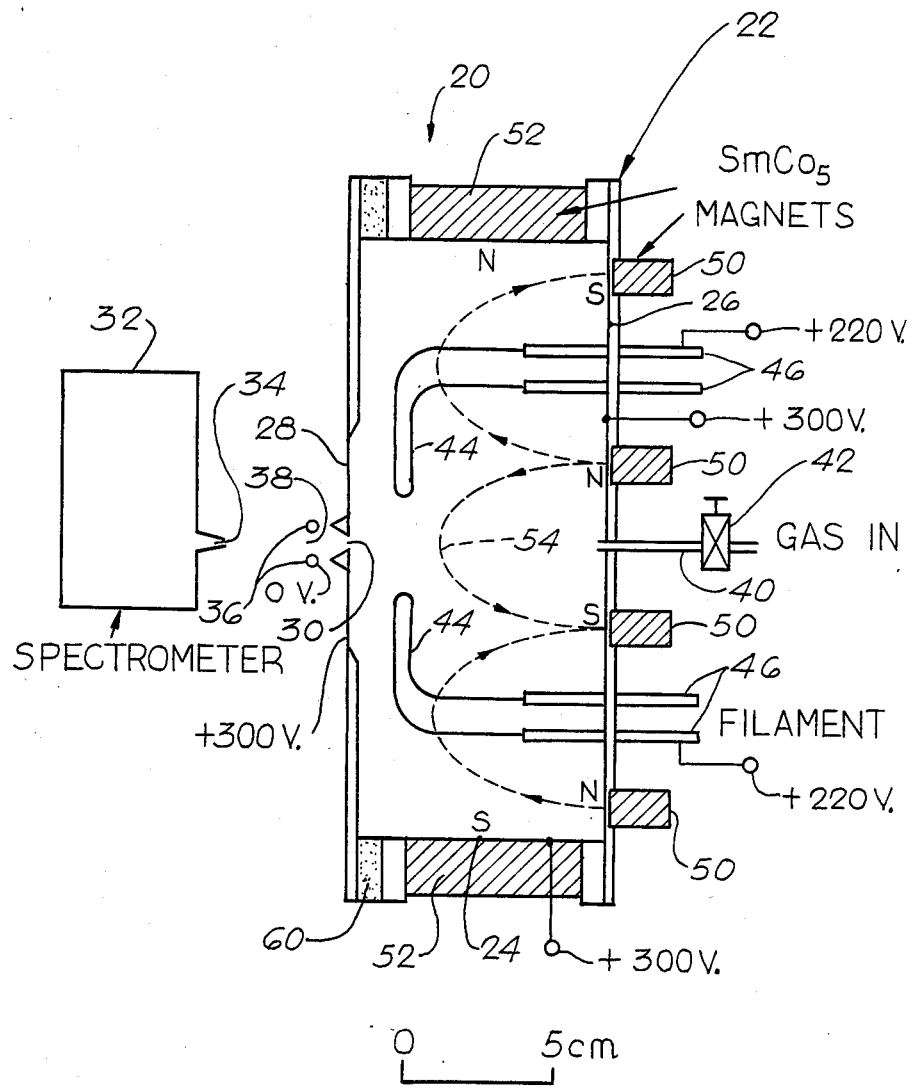
FIG. 1 is a diagrammatic sectional view of a short multicusp ion source to be descrieed as an illustrative embodiment of the present invention.

As just indicated, FIG. 1 is a diagrammatic illustration of an ion source 20, to be described as an illustrative embodiment of the present invention. The ion source 20 is capable of producing a high concentration of positively charged molecular ions of hydrogen ($H_2^+$) or deuterium ($D_2^+$). The ions are extracted from the source and then may be accelerated to any desired or suitable energy level, ranging widely from 300 volts or less to 40 keV or more, according to the desired use of the ions. The resulting beam of positive hydrogen or deuterium ions may then be neutralized in any known or suitable manner to produce an energetic neutral beam of H or D. For example, the positive ion beam may be neutralized by passing the beam through hydrogen gas. Such neutral beams will find many uses, such as in fusion systems for producing energy by nuclear fusion.

The ion source 20 of FIG. 1 comprises a chamber or housing 22 in which a low sub-atmospheric pressure is normally maintained. The chamber 22 may be of any suitable size and shape, such as generally cylindrical or generally rectangular. For example, on successful chamber 22 was generally cylindrical having a diameter of about 20 cm add a length of only about 9 cm. It is highly advantageous to make the chamber 22 short so as to minimize the path length of the positive ions in the chamber, before they are extracted. In this way, the concentration is kept high of $H_2^+$ or $D_2^+$ ions, such as 80% or higher, while minimizing the production of other ion species, such as $H^+$ and $H_3^+$ and the case of hydrogen, or $D^+$ and $D_3^+$ in the case of deuterium.

With the dimensions given above, the chamber 22 has a volume of about 2.8 liters. The illustrated chamber 22 has a generally cylindrical side wall 24 closed at one end by an end flange 26, both made of any suitable material, such as stainless steel. The opposite end of the chamber 22 is partly closed by a plasma grid 28 formed with one or more extraction slots or apertures 30 through which positive ions are extracted. As shown, the plasma grid 28 is masked down to a small extraction slot 30 through which a positive ion beam is extracted. The extracted ion beam is analyzed by a magnetic deflection mass spectrometer 32 which is convenient for testing purposes. The spectrometer 32 has an entrance slot or aperture 34, through which the positive ion beam enters the spectrometer. The entrance slot 34 is opposite and spaced from the exit slot 30.

The positive ions are extracted and accelerated to some extent by a second extraction grid 36 having a slot or aperture 38 opposite the exit slot 30. For extraction and acceleration of the positive ions, the extraction grid 36 is generally at a voltage which is negative relative to that of the plasma grid 28. The voltage may be quite high, but for testing purposes the illustrated source 20 has generally been used with a low voltage such as about 300 volts. For example, the extraction grid 36 may be grounded so as to be at zero voltage, while the plasma grid 28 may be at about +300 volts.

A gas, such as hydrogen or deuterium, is metered or fed into the chamber 22 through a tube 40 controlled by a suitable metering valve 42 which may be manually or automatically adjustable. In this case, the tube 40 extends through the end flange 26.

To aid in the production of a plasma within the chamber 22, electron emitters are provided therein, preferably in the form of one or more electrically heated filaments 44, made of any known or suitable material, such as tungsten. For example, four such filaments 44 have been successfully employed, made of 0.5 cm diameter tungsten wire. Each filament has a pair of insulated feed-through leads or supports 46, supplied with filament voltage by a suitable filament power supply source.

To establish a plasma in the chamber 22, a positive voltage is provided between the plasma grid 28 and the filaments 44. A relatively low voltage, such as +80 volts, is typical, but the voltage may be varied. Thus, with the plasma grid 28 at a voltage of about +300 V, the filaments 44 may be connected to a supply of about +220 V. The side walls 24 and the end flange 26 of the container 22 are also generally connected to a supply of +300 V, so that the entire container 22 and the plasma grid 28 serve as the anode, while the filaments 44 serve as the cathodes of the source 20.

It is desirable to confine the plasma mostly to the short space between the filaments 44 and the plasma grid 28, where positive ions are then produced for extraction from the source through the slot or slots 30 in the plasma grid 28, along short extraction paths, so as to achieve a high concentration or yield of $H_2^+$ ions. The short paths reduce the probability that other ion species will be produced by collisions between the $H_2^+$ ions and hydrogen molecules. The same applies to $D_2^+$ ions when $D_2$ is used.

The filaments 44 are close to the plasma grid 28 and this tends to concentrate the plasma between the filaments and the plasma grid. However, this close spacing also heats the plasma grid 28 by radiation, as well as by anode heating so that water or other cooling of the plasma grid may be necessary for operation at high power levels.

To keep most of the plasma away from the side walls 24 and the end flange 26 of the container 22, the source 20 is provided with a multi-cusp magnetic field pattern which reflects or curls away most of the electrons which would otherwise travel toward the side walls 24 and the end flange. This is a very important factor in confining most of the plasma to the short space between the filmments 44 and the plamma grid 28.

As shown in FIG. 1, the multi-cusp magnetic field is produced by providing a large number of permanent magnets, alternating in N and S polarity, around the side walls 24 and along the end flange 26. The magnets are outside the container 22, because the magnetic fields of the magnets penetrate through the stainless steel walls.

The arrangement of the magnets may be varied. As shown in FIG. 1, there are four rows of magnets 50 in an array behind the end flange 26, and a large number of columns, such as ten columns of magnets 52, around the side walls 24. The complex multi-cusp nature of the magnetic field is indicated by the magnetic flux lines 54 shown in broken lines in FIG. 1. Of course, these magnetic flux lines are only representative, and there are a multiplicity of multi-cusp flux paths.

The magnets 50 and 52 are preferably of the samariumcobalt ($SmCo_5$) type, for high field strength, but other types of magnets may be employed.

During testing of the ion source 20, the mass spectrometer was used to measure the ion species distribution of the extracted beam. FIGS. 2-9 represent the successful results of such tests.

During normal operation, the pressure outside the source 20 was maintained at $1 \times 10^{-4}$ Torr as measured by an ionization gauge. The actual pressure inside the source chamber 22 was approximately an order of magnitude higher. The plasma density profile in front of the plasma grid 28 was obtained by a movable Langmuir probe.

The source 20 was first operated without the permanent magnets surrounding the chamber 22. In this configuration, it was difficult to obtain a discharge from the four filaments 44 even at extremely high source pressures ($>10^{-2}$ Torr). The ten columns of samariumcobalt magnets 52 (1.3 cm wide by 1.9 cm high) were then installed on the outer surface of the source chamber side wall 24. In addition, the four rows of the same size magnets 50 were mounted on the end flange 26 to complete the line magnetic cusps. Thus, the source 20 became effectively a substantially shorter multicusp generator, with the filaments 44 located quite close to the plasma grid 28.

Figure 2:
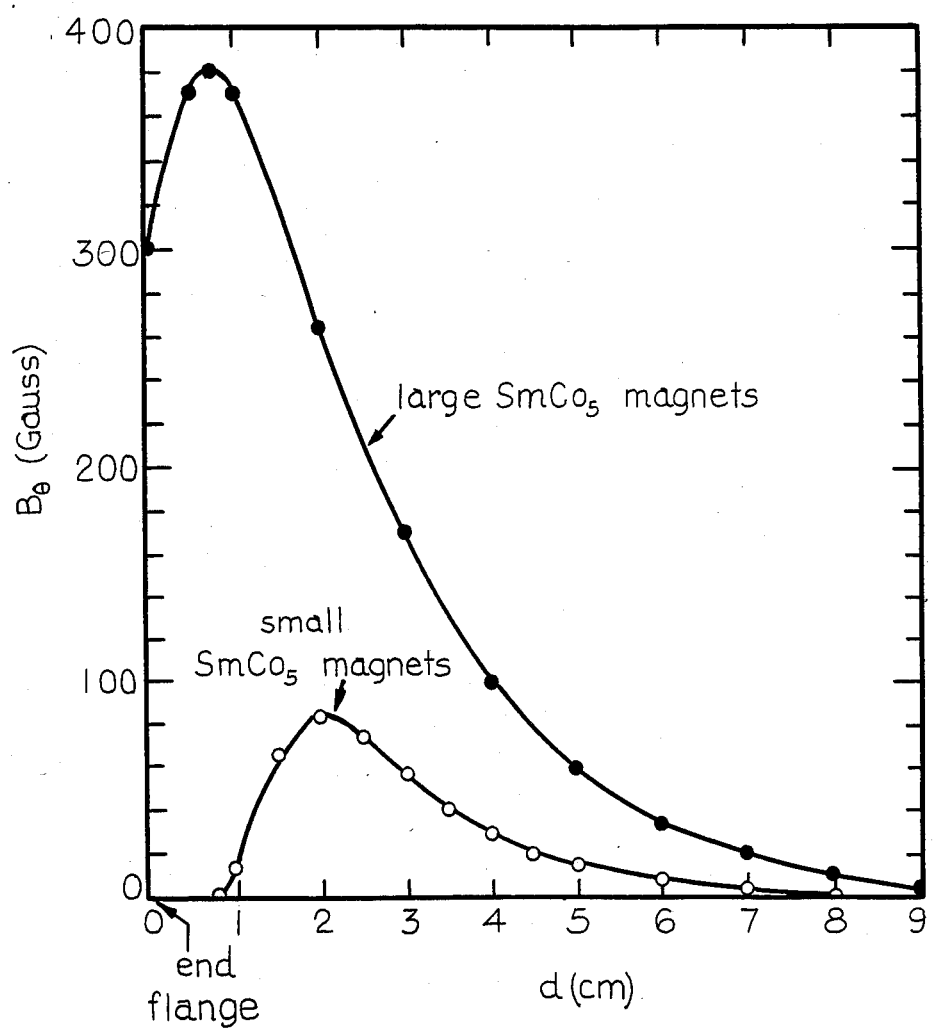
FIG. 2 is a graph in which the magnetic field component $B_\theta$, measured between two rows of magnets on the end flange of the ion source of FIG. 1, is plotted as a function of the axial position.
Figure 3:
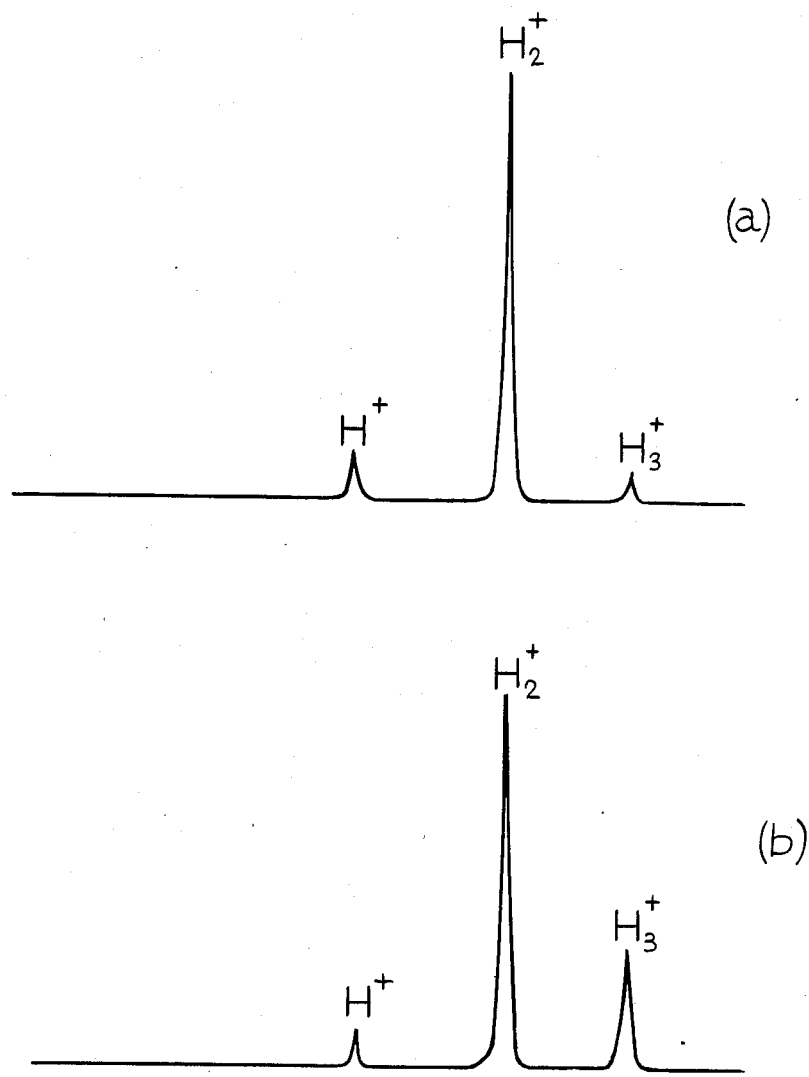
FIG. 3 is a representation of spectrometer output signals showing the measured distribution of hydrogen ion species for a discharge voltage of 80 volts and a discharge current of 10 amperes, for two cases: (a) when the end flange is covered by four rows of large samarium-cobalt magnets, and (b) when the end flange is covered with four rows of smaller samarium-cobalt magnets.

FIG. 2 shows the magnetic field component $B_\theta$ measured between two magnet rows on the end flange 26 as a function of the axial position. Since the pimary electrons ($E \approx 80$ eV)) are reflected at regions where $B_\theta$ equals or exceeds approximately 20 G, the axial length of plasma volume i only about 2 cm. With the new arrangement of this invention, it was found that a hydrogen discharge could generally be started only with the plasma grid 28 connected to the anode. Since the side walls 24 and the end flange 26 were mostly shielded by the multi-cusp permanent magnet dipole-field, the plasma grid 28 became the main anode for the discharge. However, the source 20 could now be easily operated even at pressures as low as $10^{-4}$ Torr.

FIG. 3(a) shows a typical spectrometer output signal when the source 20 was operated with a discharge voltage of 80 V and a discharge current of 10 Amp. It can be seen that 82% of the extracted beam is made up of $H_2^+$ ions. The percentages of $H^+$ and $H_3^+$ ions are about the same, aprroximately 10%.

Figure 4:
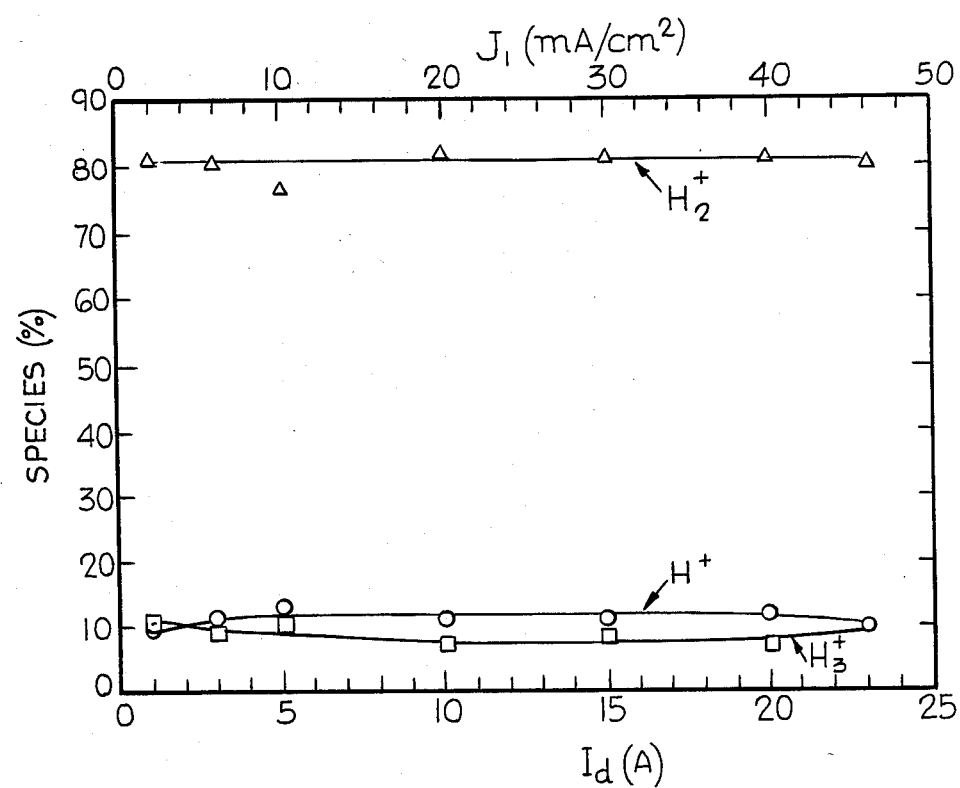
FIG. 4 is a graph showing test results in which the hydrogen ion species distribution from the ion source is plotted as a function of the discharge current $I_d$, and also as a function of the corresponding ion current density, measured at the extraction plane.

FIG. 4 shows a plot of the hydrogen ion species distribution as a function of the discharge current $I_d$. As $I_d$ is increased from 1 A to 23 A, the percentage of $H_2^+$ ions remains almost constant at 80%. SSource operation with higher $I_d$ was limited by the number of filaments 44 available and the high power loading on the plasma grid 28 which was not water-cooled. The extractable ion current density is about 50 mA/cm² at $I_d=25$ A.

Figure 5:
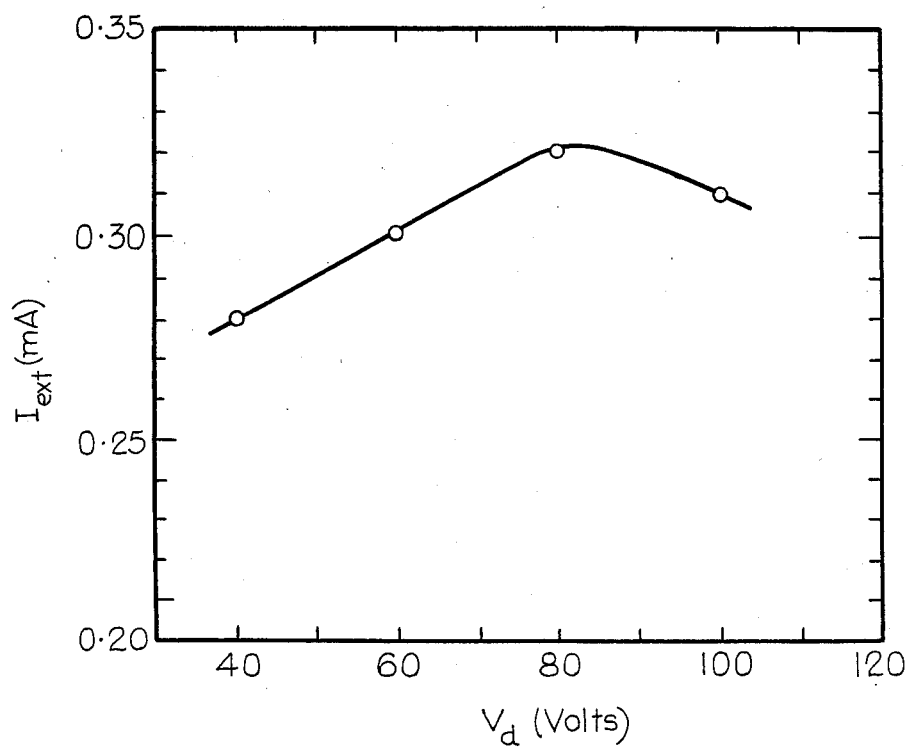
FIG. 5 is a graph showing test results in which the extracted ion current is plotted as a function of the discharge voltage for a fixed source pressure and discharge current.

It was also observed that the amount of extracted current was a function of the discharge voltage $V_d$. For a fixed source pressure and discharge current $I_d$, FIG. 5 shows that the extracted current peaks around $V_d=80$ V, but there was no significant change in the species distribution for the range of $V_d$ considered.

Figure 6:
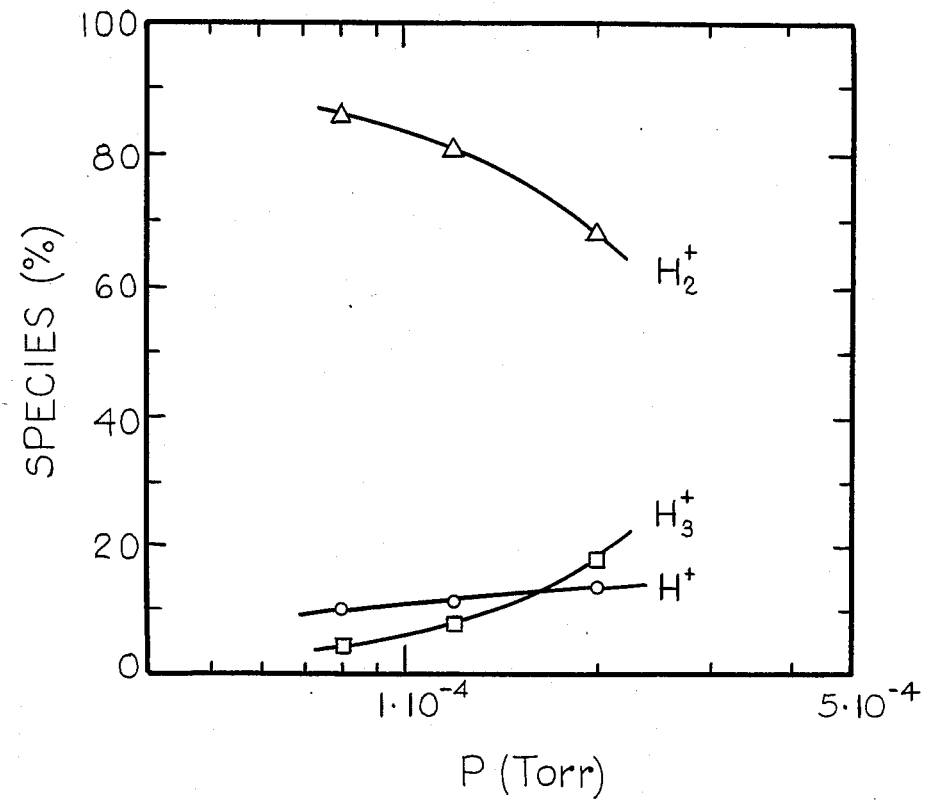
FIG. 6 is a graph showing test results in which the hydrogen ion species distribution is plotted as a function of source pressure for a fixed discharge voltage of 80 volts and a discharge current of 10 amperes.

FIG. 6 shows the ion species distribution for three different pressures. In general, the lower the source pressure, the higher will be the $H_2^+$ ion percentage. As the pressure outside the source chamber 22 was varied from $8 \times 10^{-5}$ Torr to $2 \times 10^{-4}$ Torr, the $H_2^+$ ion concentration dropped from 86% to 68%. On the other hand, the extracted current increased with the pressure but saturated at about $1 \times 10^{-4}$ Torr.

Most of the discharge current was collected at the plasma grid 28 and therefore it was the main anode for the discharge. As this electrode was electrically isolated from the remainder of the source chamber 22 by an insulator 60, it was possible to bias the source chamber 22 together with the end flange 26 positive with respect to the plasma. The effect of this magneto-electrostatic containment scheme is to reduce the ion loss to this portion of the chamber 22, resulting in an increase in the overall efficiency of the ion source 20. By biasing the source chamber 22 and the end flange 26 +15 V relative to the plasma grid 28, it was found that the extracted ion current was increased by about 30%. Only a small decrease in the $H_2^+$ ion fraction (about two percentage points) was observed for a range of $I_d$.

Figure 7:
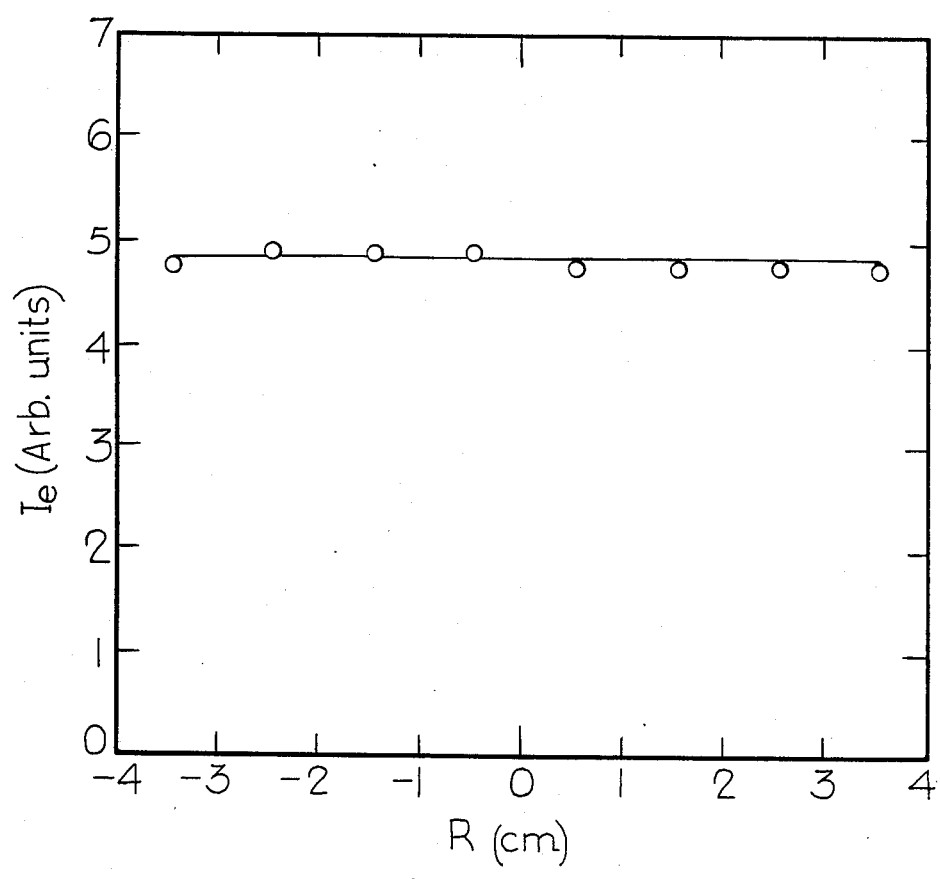
FIG. 7 is a graph of test results in which the ion current density is plotted as a function of the radial position in front of the plasma grid.

The plasma density profile across the extraction area ($7 \times 7$ cm²) was measured by a movable Langmuir probe. FIG. 7 shows a plot of the saturated electron current as a function ff the radial position in front of the plasma grid 28. The result does demonstrate that the profile was reasonably uniform within the extraction region.

The depth of B-field penetration from the permanent magness 50 on the end flange 26 was varied by replacing the four rows of large samarium-cobalt mageets with five rows of much smaller (cross-sectional area $=4.5 \times 4.5$ mm²) samarium-cobalt magnets. The $B\theta$ component measured between two rows is shown in FIG. 2. Since the 20 G boundary was now located at 4.5 cm from the extractor 36, some of the $H_2^+$ ions produced would travel a longer distance before arriving at the extraction grid 36.

Figure 8:
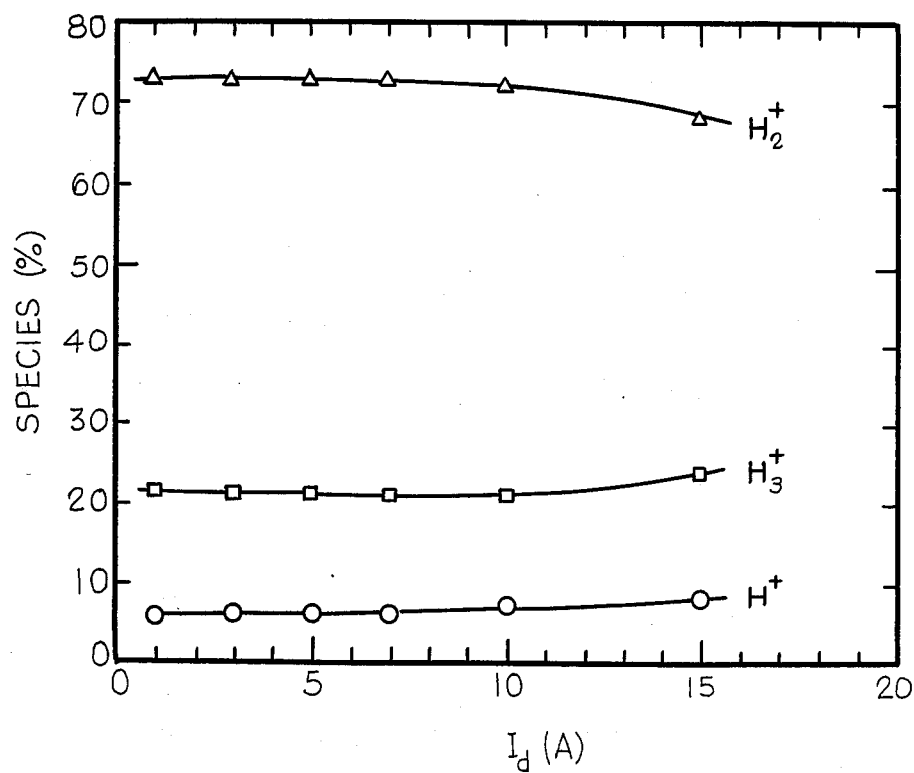
FIG. 8 is a graph of test results in which the hydrogen ion species distribution is plotted as a function of the discharge current $I_d$ when the end flange of the source is covered with four rows of smaller samarium-cobalt magnets, rather than the large magnets represented by the case of FIG. 4.

FIG. 3(b) shows a spectrometer output signal obtained at $V_d=80$ V, $I_d=10$ A and at a pressure of $1 \times 10^{-4}$ Torr measured outside the source 20. Comparing with the data shown in FIG. 3(a), the $H_2^+$ fraction has been reduced to 71% and the $H_3^+$ ion concentration has increased to 22%. This observation clearly demonstrates that a short plasma volume is very advantageous for achieving a high percentage of $H_2^+$ ions in the beam. FIG. 8 shows a plot of the species distribution for this new magnet arrangement as a function of discharge current. As $I_d$ is increased from 1 A to 10 A, the $H_2^+$ ion fraction remains essentially constant at about 72%. When Ihd d is greater than 10 A, the $H_2^+$ ion percentage starts to decrease while the $H_3^+$ percentage begins to increase.

Figure 9:
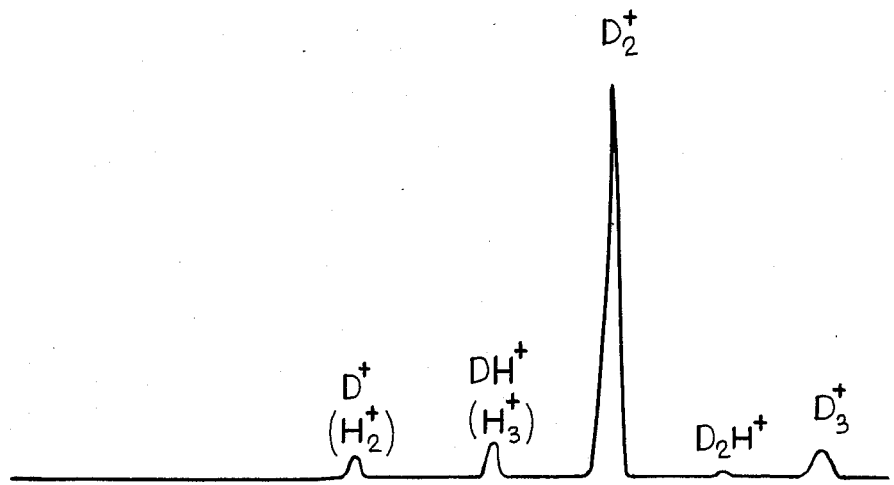
FIG. 9 is a representation of a spectrometer output signal showing the ion species dittribution when the source is operated with a deuterium plasma, rather than a hydrogen plasma, as in FIG. 3.

The source 20 was also operated with a deuterium plasma using the large samarium-cobalt magnets 50 on the end flange. FIG. 9 shows a spectrometer output signal for $V_d=\lambda V$ and $I_d=10$ A with an outside source pressure of $7 \times 10^{-5}$ Torr. Again, the $D_2^+$ ion is the dominant species and its concentration in the beam exceeds 80%. In addition to the three deuterimm ion peaks ($D^+$, $D_2^+$ and $D_3^+$), two other peaks also appear in the spectrum. They are deuteriumhydrogen ions ($DH^+$, $D_2H^+$) which are formed when the deuterium reacts with the residual hydrogen left in the source chamber 22.

It is possible to scale tee source operation up to higher discharge power so as to study and utilize the species distribution at higher current densities. The sizable amount of heat loading on the plasma grid 28 due to bombardment by electrons and to radiation from the nearby hot filaments 44 will eventually require active cooling of the grid rails, particularly for the case of long pulse operation. Because the source can be operated at pressures lower than a mTorr, it is generally possible to feed gas into the source chamber from the neutralizer region.

What is claimed is:

1. A positive ion source for producing a beam of high concentration positively charged molecular ions when supplied witn hydrogen or deuterium, said ion source comprising:
   a plasma chamber constructed so as to minimize the path length of positive ions in the chamber before such ions are extracted therefrom,
   electron emitting means positioned in said chamber,
   means for metering hydrogen or deuterium into said chamber,
   a plasma grid forming a wall of said plasma chamber and spaced form said electron emitting means and having an extraction opening therein through which a beam of high concentration positive ions is extracted, said extraction opening having a small cross-section reactive to an adjacent cross-section of said chamber, extractor electrode means located outside said chamber adjacent to an in alignment with said extraction opening of said plasma grid for extracting a beam of positive ions from said chamber through said extraction opening, said electron emitting means being located closely adjacent with respect to said plasma grid and closely adjacent to said extraction opening in said plasma grid so that the path length of positive ions from the neighborhood of said electron emitting means to said extraction opening is short in relation it the mean free path of the hydrogen or deuterium molecules in said chamber to achieve a high concentration of hydrogen or neuterium ions and to minimize the production of other ions species by collisions of the positive hydrogen or dueterium ions with hydrogen or deuterium molecules.

2. A positive ion source according to claim 1,
in which said chamber has walls other than said plasma grid,
said source having magnetic means for producing a multi-cusp magnetic field between said walls and said emitting means to reflect electrons away from said walls for largely confining the plasma in said chamber to the space between said emitting means and said plasma grid.

3. A positive ion source according to claim 2,
said magnetic means including an array of magnets of alternating polarity adjacent said walls.

4. A positive ion source according to claim 2,
said magnetic means including rows of permanent magnets adjacent said walls and of alternating polarity.

5. A positive ion source according to claim 1,
said electron emitting means being at a short distance from said plasma grid,
said chamber having a length which is substantially greater than said short distance.

6. A positive ion source according to claim 1,
said chamber having an end wall on the opposite end of said chamber from said plasma grid,
said chamber having side wall means extending between said end wall and said plasma grid,
said chamber having a length between said end wall and said plasma grid which is substantially shorter than the distance between opposite portions of said side wall means.

7. A positive ion source according to claim 6,
including magnetic means forming a multi-cusp magnetic field adjacent said end wall and said side wall means for reflecting electrons to largely confine the plasma in said chamber to the space between said emitting means and said plasma grid.

8. A positive ion source according to claim 7,
said mageetic means including arrays of permanent magnets of alternating polarity adjacent said end wall and said side wall means.

9. A method of producing a beam of high concentration positive molecular ions and extracting the beam from a space containing a molecular gas at a sub-atmospheric pressure, said method comprising the steps of:
emitting electrons from a cathode located in said space,
forming an anode electrode form certain of the walls defining said space and from a plasma grid having an aperture therein of a cross-section substantially smaller than the cross-section of said space,
accelerating said electrons by a positive voltage between said anode electrode and said cathode and thereby producing a plasma containing a high concentration of positive molecular ions,
and extracting a beam of said high concentration positive ions through said aperture in said anode electrode while providing a short path length for said extracted beam of ions relative to the mean free path of the gas molecules to achieve a high concentration of positive ions and to minimize the production of other ion species due to collisions between the positive molecular ions and the gas molecules.

10. A method according to claim 9, including a the step of using hydrogen as the molecular gas.

11. A method according to claim 9, including the step of using deuterium as the gas 12. A method according to claim 9, in which a multi-cusp magnetic field is produced in portions of said space remote from said anode for largely confining the plasma to the portion of said space between said anode and said cathode.

* * * * *